(12) United States Patent
Lee et al.

(10) Patent No.: US 12,067,245 B2
(45) Date of Patent: Aug. 20, 2024

(54) MEMORY CONTROLLER AND METHOD OF OPERATING THE SAME

(71) Applicant: SK hynix Inc., Gyeonggi-do (KR)

(72) Inventors: Seon Ju Lee, Gyeonggi-do (KR);
Seung Geol Baek, Gyeonggi-do (KR);
Jae Hyun Yoo, Gyeonggi-do (KR);
Dong Kyu Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/081,605

(22) Filed: Dec. 14, 2022

(65) Prior Publication Data

US 2023/0384937 A1 Nov. 30, 2023

(30) Foreign Application Priority Data

May 31, 2022 (KR) .......................... 10-2022-0066799

(51) Int. Cl.
*G06F 12/00* (2006.01)
*G06F 3/06* (2006.01)

(52) U.S. Cl.
CPC .......... *G06F 3/0611* (2013.01); *G06F 3/0653* (2013.01); *G06F 3/0679* (2013.01)

(58) Field of Classification Search
CPC .... G06F 3/0611; G06F 3/0653; G06F 3/0679; G06F 3/0604; G06F 2212/1024
See application file for complete search history.

(56) References Cited

U.S. PATENT DOCUMENTS

| | | | |
|---|---|---|---|
| 9,747,040 | B1 | 8/2017 | Balakrishnan et al. |
| 11,355,169 | B2* | 6/2022 | Hasbun ............... G06F 12/0893 |
| 2012/0314648 | A1* | 12/2012 | Zhang .................. H04L 1/1848 |
| | | | 370/328 |
| 2020/0092748 | A1* | 3/2020 | Teyeb ....................... H04L 1/00 |
| 2021/0216491 | A1* | 7/2021 | Weaver ............... B41J 2/17546 |
| 2022/0013186 | A1* | 1/2022 | Khayat .................. G11C 29/44 |
| 2022/0043596 | A1* | 2/2022 | Madraswala ........ G11C 29/021 |
| 2022/0382486 | A1* | 12/2022 | Kim ....................... G06F 3/061 |

FOREIGN PATENT DOCUMENTS

KR 10-2021-0013845 A 2/2021

OTHER PUBLICATIONS

English machine translation of CN113625939A (Year: 2021).*

* cited by examiner

*Primary Examiner* — John A Lane
(74) *Attorney, Agent, or Firm* — IP & T GROUP LLP

(57) ABSTRACT

The present technology relates to an electronic device. According to the present technology, a memory controller may include a latency monitor and an operation controller. The latency monitor may count an over-latency count value representing a number of over-latencies exceeding a reference value among latencies for requests from a host during each of a plurality of periods, calculate gaps which are difference values between the over-latency count values of the plurality of periods, and generate latency information including the over-latency count values and the gaps. The operation controller may determine, based on the latency info oration, whether each gap between at least two target periods among the plurality of periods exceeds a threshold value, and delay a response to the requests according to a determination result.

20 Claims, 15 Drawing Sheets

FIG. 5

| Period | # of Latency | # of Over Latency | Gap |
|---|---|---|---|
| PD1 | 5 | 3 | - |
| PD2 | 3 | 1 | -2 |
| PD3 | 4 | 4 | 3 |
| PD4 | 6 | 6 | 2 |

FIG. 6

| Period | # of Latency | # of Over Latency | Gap | |
|---|---|---|---|---|
| PD1 | 15 | 10 | - | |
| PD2 | 15 | 14 | ④ | 4>TH_G(=3) |
| PD3 | 15 | 14 | ⓪ | 0<TH_G(=3) |
| PD4 | 20 | 16 | ② | 2<TH_G(=3) |

FIG. 7

| Period | # of Latency | # of Over Latency | Gap |
|---|---|---|---|
| PD1 | 15 | 10 | - |
| PD2 | 10 | 10 | ① → 0<TH_G(=3) |
| PD3 (Target) | 15 | 14 | ④ → 4>TH_G(=3) |
| PD4 (Target) | 20 | 19 | ⑤ → 5>TH_G(=3) |

FIG. 8

Response Time = Default Value

Response Time* = Default Value + (# of Over Latency of Latest Target Period − Allowable Over Latency Count) * A e.g.) Response Time* = 10 + (19−9) * 0.5 = 15

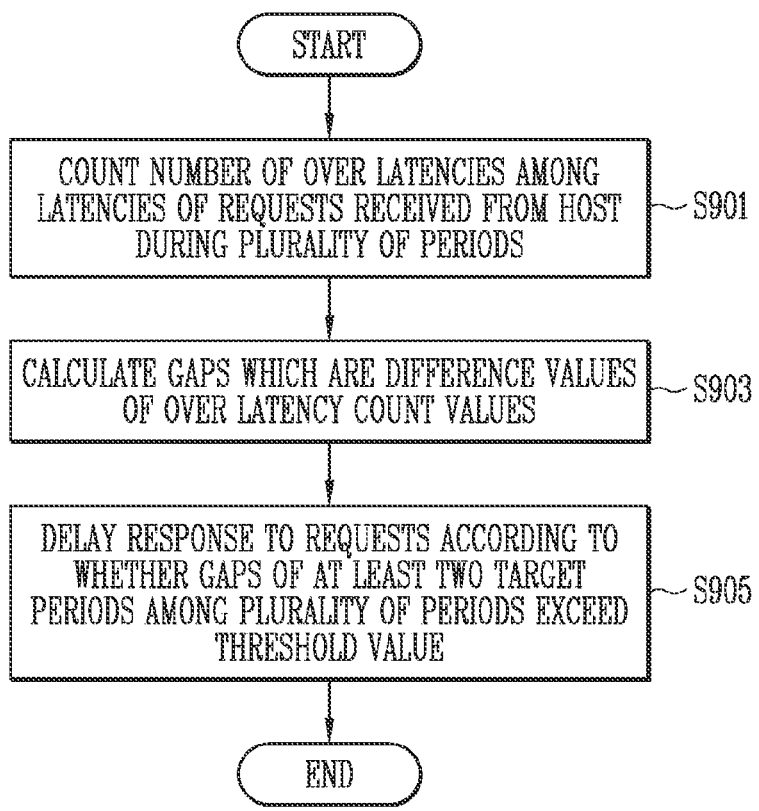

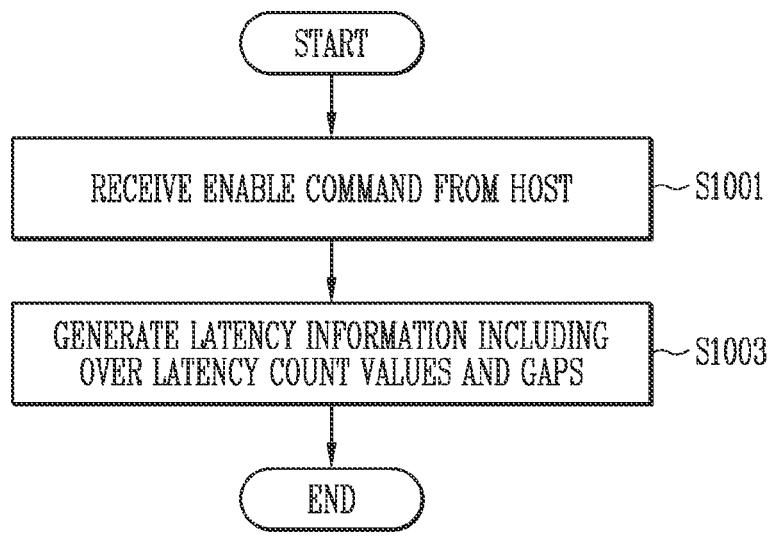
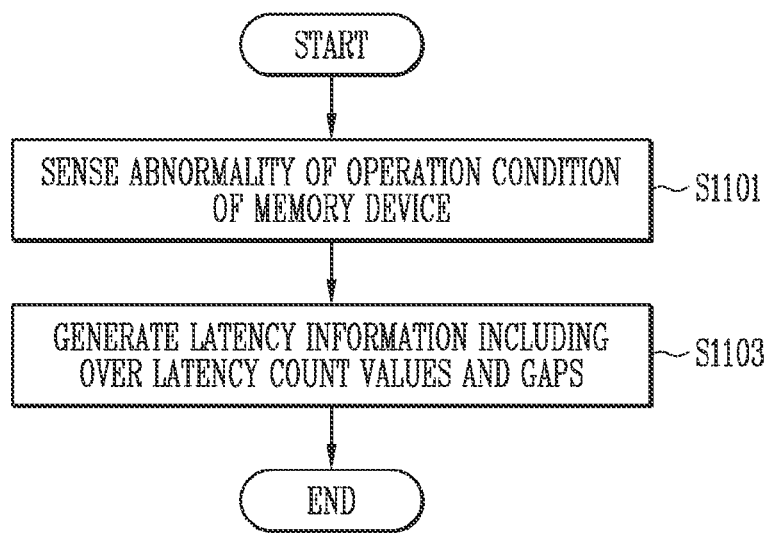

MEMORY CONTROLLER AND METHOD OF OPERATING THE SAME

CROSS-REFERENCE TO RELATED APPLICATION

The present application claims priority under 35 U.S.C. § 119(a) to Korean patent application number 10-2022-0066799, filed on May 31, 2022, the entire disclosure of which is incorporated herein by reference.

BACKGROUND

Field of Invention

The present disclosure relates to an electronic device, and more particularly, to a memory controller and a method of operating the same.

Description of Related Art

A storage device is a device that stores data under control of a host device such as a computer or a smartphone. The storage device may include a memory device in which data is stored and a memory controller controlling the memory device. The memory device is divided into a volatile memory device and a nonvolatile memory device.

The volatile memory device is a device that stores data only when power is supplied and loses the stored data when the power supply is cut off. The volatile memory device includes a static random access memory (SRAM), a dynamic random access memory (DRAM), and the like.

The nonvolatile memory device is a device that does not lose data even though power is cut off. The nonvolatile memory device includes a read only memory (ROM), a programmable ROM (PROM), an electrically programmable ROM (EPROM), an electrically erasable and programmable ROM (EEPROM), a flash memory, and the like.

The memory controller may monitor latency of a request received from the host, and may delay a response to the request of the host when an abnormality of the latency is sensed. The memory controller may gradually improve quality of service (QoS) by responding to the host by delaying a response time until the abnormality of the latency is recovered.

SUMMARY

An embodiment of the present disclosure provides a memory controller and a method of operating the same improving response latency by delaying a response to a request of a host.

According to an embodiment of the present disclosure, a memory controller may include a latency monitor and an operation controller. The latency monitor may count an over-latency count value representing a number of over-latencies exceeding a reference value among latencies for requests from a host during each of a plurality of periods, calculate gaps which are difference values between the over-latency count values of the plurality of periods, and generate latency information including the over-latency count values and the gaps. The operation controller may determine, based on the latency information, whether each gap between at least two target periods among the plurality of periods exceeds a threshold value, and delay a response to the requests according to a determination result.

According to an embodiment of the present disclosure, a method of operating a memory controller may include counting an over-latency count value representing a number of over-latencies exceeding a reference value among latencies for requests of a host during each of a plurality of periods, calculating gaps which are difference values between the over-latency count values of the plurality of periods, generating latency information including the over-latency count values and the gaps, determining, based on the latency information, whether each gap corresponding to at least two target periods among the plurality of periods exceeds a threshold value, and delaying a response to the requests according to a result of the determining.

According to an embodiment of the present disclosure, an operating method of a device may comprise obtaining gaps between a sequence of over-latency counts respectively for consecutive time sections, and delaying a response when each of two or more of the gaps is greater than a threshold.

According to the present technology, a memory controller and a method of operating the same improving response latency by delaying a response to a request of a host are provided.

BRIEF DESCRIPTION OF THE DRAWINGS

FIG. 5 is a diagram illustrating over-latency count values and gaps in FIG. 4 according to an embodiment of the present disclosure.

FIG. 6 is a diagram illustrating latency information when a response to the host is not delayed according to an embodiment of the present disclosure.

FIG. 7 is a diagram illustrating the latency information when the response to the host is delayed according to an embodiment of the present disclosure.

FIG. 8 is a diagram illustrating a response ti ne according to an embodiment of the present disclosure.

FIG. 9 is a flowchart illustrating an operation of a memory controller according to an embodiment of the present disclosure.

FIG. 10 is a flowchart illustrating an operation of a memory controller according to an embodiment of the present disclosure.

FIG. 11 is a flowchart illustrating an operation of a memory controller according to an embodiment of the present disclosure.

DETAILED DESCRIPTION

Specific structural or functional descriptions of embodiments according to the concept which are disclosed in the present specification are illustrated only to describe the embodiments according to the concept of the present disclosure. The embodiments according to the concept of the present disclosure may be carried out in various forms and should not be construed as being limited to the embodiments described in the present specification.

Figure 1:
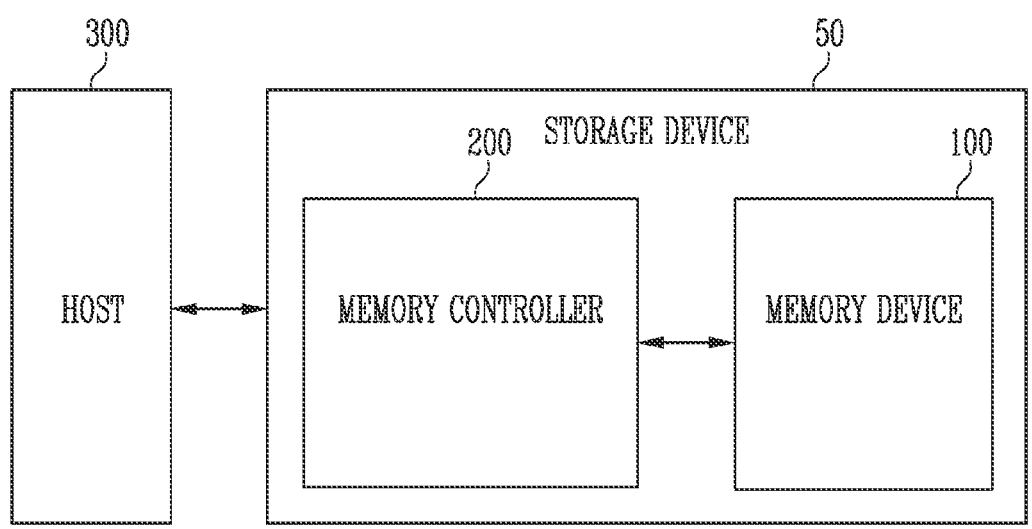
FIG. 1 is a diagram illustrating a storage device according to an embodiment of the present disclosure.

FIG. 1 is a diagram illustrating a storage device according to an embodiment of the present disclosure.

Referring to FIG. 1, the storage device 50 may include a memory device 100 and a memory controller 200 that controls an operation of the memory device. The storage device 50 is a device that stores data under control of a host 300 such as a cellular phone, a smartphone, an MP3 player, a laptop computer, a desktop computer, a game player, a TV, a tablet PC, or an in-vehicle infotainment system.

The storage device 50 may be manufactured as one of various types of storage devices according to a host interface that is a communication method with the host 300. For example, the storage device 50 may be configured as one of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 50 may be manufactured as any of various types of packages. For example, the storage device 50 may be manufactured as any of various package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates under control of the memory controller 200. The memory device 100 may include a memory cell array including a plurality of memory cells that store data.

Each of the memory cells may be configured as a single level cell (SLC) storing one data bit, a multi-level cell (MLC) storing two data bits, a triple level cell (TLC) storing three data bits, or a quad level cell (QLC) storing four data bits.

The memory cell array may include a plurality of memory blocks. Each memory block may include a plurality of memory cells. One memory block may include a plurality of pages. In an embodiment, the page may be a unit for storing data in the memory device 100 or reading data stored in the memory device 100.

The memory block may be a unit for erasing data. In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like. In the present specification, for convenience of description, the memory device 100 is a NAND flash memory.

The memory device 100 may receive a command and an address from the memory controller 200 and access an area selected by the address of the memory cell array. That is, the memory device 100 may perform an operation instructed by the command on the area selected by the address. For example, the memory device 100 may perform a write operation (program operation), a read operation, and an erase operation. During the program operation, the memory device 100 may program data to the area selected by the address. During the read operation, the memory device 100 may read data from the area selected by the address. During the erase operation, the memory device 100 may erase data stored in the area selected by the address.

The memory controller 200 controls an overall operation of the storage device 50.

When power is applied to the storage device 50, the memory controller 200 may execute firmware FW. When the memory device 100 is a flash memory device, the memory controller 200 may operate firmware such as a flash translation layer (FTL) for controlling communication between the host 300 and the memory device 100.

In an embodiment, the memory controller 200 may receive data and a logical block address (LBA) from the host 300 and convert the LBA into a physical block address (PBA) indicating an address of memory cells in which data included in the memory device 100 is to be stored.

The memory controller 200 play control the memory device 100 to perform the program operation, the read operation, or the erase operation in response to a request of the host 300. During the program operation, the memory controller 200 may provide a write command, a physical block address, and data to the memory device 100. During the read operation, the memory controller 200 may provide a read command and the physical block address to the memory device 100. During the erase operation, the memory controller 200 may provide an erase command and the physical block address to the memory device 100.

In an embodiment, the memory controller 200 may generate and transmit the command, the address, and the data to the memory device 100 regardless of the request from the host 300. For example, the memory controller 200 may provide the command, the address, and the data to the memory device 100 to perform background operations such as a program operation for wear leveling and a program operation for garbage collection.

In an embodiment, the memory controller 200 may control at least two memory devices 100. In this case, the memory controller 200 may control the memory devices 100 according to an interleaving method to improve operation performance. The interleaving method may be an operation method for overlapping operation periods of at least two memory devices 100.

The memory controller 200 may control a plurality of memory devices 100 connected through at least one or more channels. Each memory device 100 may include at least one or more planes. Each plane may include a plurality of memory blocks.

Figure 2:
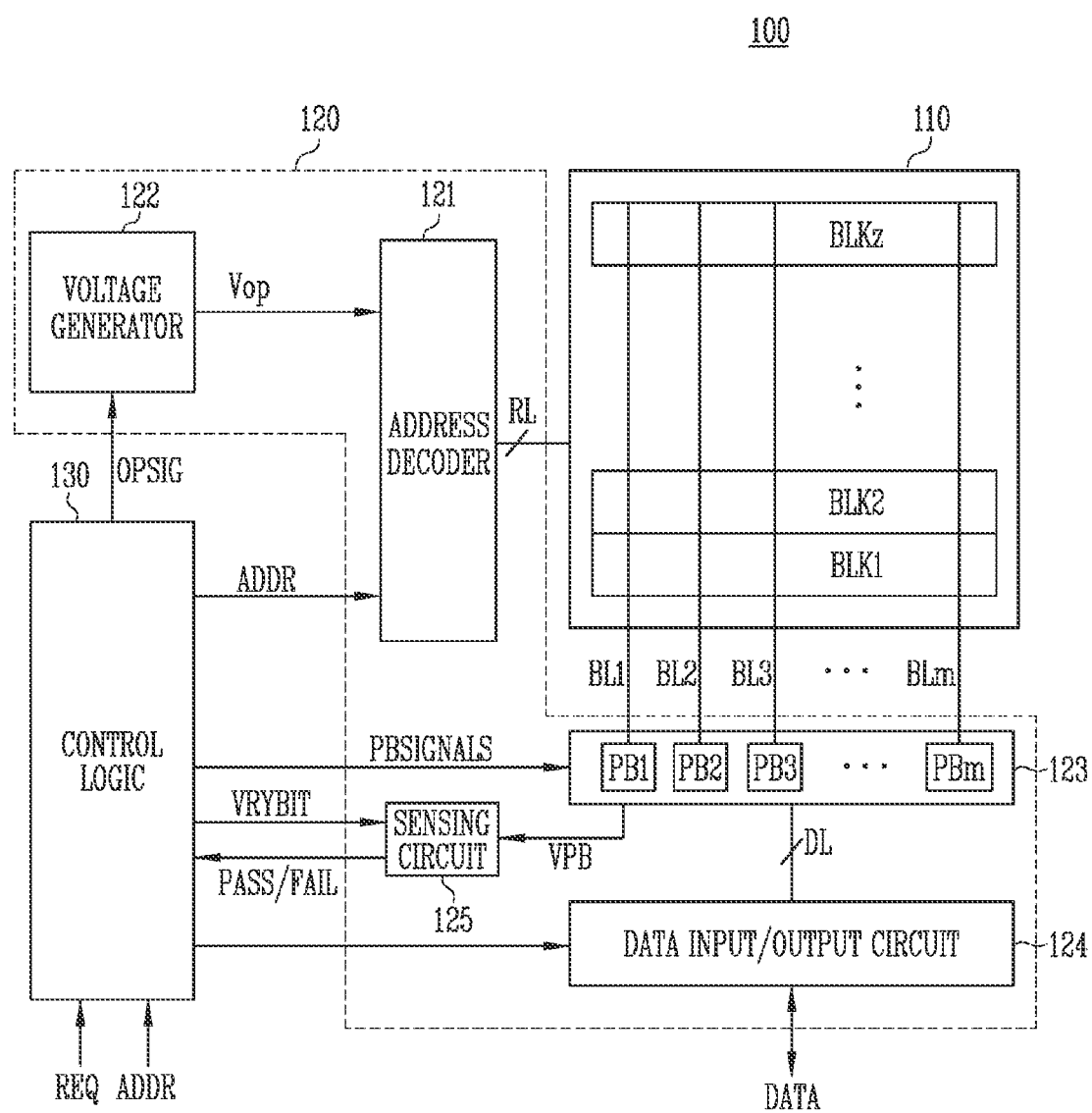
FIG. 2 is a diagram illustrating a structure of a memory device of FIG. 1 according to an embodiment of the present disclosure.

The host 300 may communicate with the storage device using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM), FIG. 2 is a diagram illustrating a structure of the memory device of FIG. 1 according to an embodiment of the present disclosure.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are connected to an address decoder 121 through row lines RL. The plurality of memory blocks BLK1 to BLKz are connected to a read and write circuit 123 through bit lines BL1 to BLm. Each of the plurality of memory blocks BLK1 to BLKz includes a plurality of memory cells. In an embodiment, the plurality of memory cells are nonvolatile memory cells. Memory cells connected to the same word line among the plurality of memory cells are defined as one physical page. That is, the memory cell array 110 is configured of a plurality of physical pages. According to an embodiment of the present disclosure, each of the plurality of memory blocks BLK1 to BLKz included in the memory cell array 110 may include a plurality of dummy cells. At least one of the dummy cells may be connected in series between a drain select transistor and the memory cells and between a source select transistor and the memory cells.

Each of the memory cells of the memory device 100 may be configured as an SLC that stores one data bit, an MLC that stores two data bits, a TLC that stores three data bits, or a QLC that stores four data bits.

The peripheral circuit 120 may include an address decoder 121, a voltage generator 122, the read and write circuit 123, a data input/output circuit 124, and a sensing circuit 125. The peripheral circuit 120 drives the memory cell array 110. For example, the peripheral circuit 120 may drive the memory cell array 110 to perform a program operation, a read operation, and an erase operation.

The address decoder 121 is connected to the memory cell array 110 through the row lines RL. The row lines RL may include drain select lines, word lines, source select lines, and a common source line. According to an embodiment of the present disclosure, the word lines may include normal word lines and dummy word lines. According to an embodiment of the present disclosure, the row lines RL may further include a pipe select line.

The address decoder 121 may operate in response to control of the control logic 130. The address decoder 121 receives an address ADDR from the control logic 130.

The address decoder 121 may decode a block address of the received address ADDR. The address decoder 121 selects at least one memory block among the memory blocks BLK1 to BLKz according to the decoded block address. The address decoder 121 may decode a row address of the received address ADDR. The address decoder 121 may select at least one word line among word lines of a selected memory block according to the decoded address. The address decoder 121 may apply an operation voltage Vop received from the voltage generator 122 to the selected word line.

During the program operation, the address decoder 121 may apply a program voltage to a selected word line and apply a pass voltage having a level less than that of the program voltage to unselected word lines. During a program verify operation, the address decoder 121 may apply a verify voltage to the selected word line and apply a verify pass voltage having a level greater than that of the verify voltage to the unselected word lines.

During the read operation, the address decoder 121 may apply a read voltage to the selected word line and apply a read pass voltage having a level greater than that of the read voltage to the unselected word lines.

According to an embodiment of the present disclosure, the erase operation of the memory device 100 is performed in a memory block unit. The address ADDR input to the memory device 100 during the erase operation includes a block address. The address decoder 121 may decode the block address and select at least one memory block according to the decoded block address. During the erase operation, the address decoder 121 may apply a ground voltage to the word lines of the selected memory block.

According to an embodiment of the present disclosure, the address decoder 121 may be configured to decode a column address of the transferred address ADDR. The decoded column address may be transferred to the read and write circuit 123. As an example, the address decoder 121 may include a component such as a row decoder, a column decoder, and an address buffer.

The voltage generator 122 may generate a plurality of operation voltages Vop by using an external power voltage supplied to the memory device 100. The voltage generator 122 operates in response to the control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate the plurality of operation voltages Vop using the external power voltage or the internal power voltage. The voltage generator 122 may be configured to generate various voltages required by the memory device 100. For example, the voltage generator 122 may generate a plurality of erase voltages, a plurality of program voltages, a plurality of pass voltages, a plurality of selection read voltages, and a plurality of non-selection read voltages.

In order to generate the plurality of operation voltages Vop having various voltage levels, the voltage generator 122 may include a plurality of pumping capacitors that receive the internal voltage and selectively activate the plurality of pumping capacitors in response to the control logic 130 to generate the plurality of operation voltages Vop. The plurality of generated operation voltages glop may be supplied to the memory cell array 110 by the address decoder 121.

The read and write circuit 123 includes first to m-th page buffers PB1 to PBm. The first to m-th page buffers PB1 to PBm are connected to the memory cell array 110 through first to m-th bit lines BL1 to BLm, respectively. The first to m-th page buffers PB1 to PBm operate in response to the control of the control logic 130.

The first to m-th page buffers PB1 to PBm communicate data DATA with the data input/output circuit 124. At a time of programming, the first to m-th page buffers PB1 to PBm receive the data DATA to be stored through the data input/output circuit 124 and data lines DL.

During the program operation, when a program voltage is applied to the selected word line, the first to m-th page buffers PB1 to PBm may transfer the data DATA to be stored, that is, the data DATA received through the data input/output circuit 124 to the selected memory cells through the bit lines BL1 to BLm. The memory cells of the selected page are programmed according to the transferred data DATA. A memory cell connected to a bit line to which a program permission voltage (for example, a ground voltage) is applied may have an increased threshold voltage. A threshold voltage of a memory cell connected to a bit line to which a program inhibition voltage (for example, a power voltage) is applied may be maintained. During the program verify operation, the first to m-th page buffers PB1 to PBm read the data DATA stored in the memory cells from the selected memory cells through the bit lines BL1 to BLm.

During the read operation, the read and write circuit 123 may read the data DATA from the memory cells of the selected page through the bit lines BL1 to BLm and store the read data DATA in the first to m-th page buffers PB1 to PBm.

During the erase operation, the read and write circuit 123 may float the bit lines BL1 to BLm. In an embodiment, the read and write circuit 123 may include a column select circuit.

The data input/output circuit 124 is connected to the first to m-th page buffers PB1 to PBm through the data lines DL. The data input/output circuit 124 operates in response to the control of the control logic 130.

The data input/output circuit 124 may include a plurality of input/output buffers (not shown) that receive input data DATA. During the program operation, the data input/output circuit 124 receives the data DATA to be stored from an external controller (not shown). During the read operation, the data input/output circuit 124 outputs the data DATA transferred from the first to m-th page buffers PB1 to PBm included in the read and write circuit 123 to the external controller.

During the read operation or the verify operation, the sensing circuit 125 may generate a reference current in response to a signal of an allowable bit VRYBIT generated by the control logic 130 and may compare a sensing voltage VPB received from the read and write circuit 123 with a reference voltage generated by the reference current to output a pass signal or a fail signal to the control logic 130.

The control logic 130 may be connected to the address decoder 121, the voltage generator 122, the read and write circuit 123, the data input/output circuit 124, and the sensing circuit 125. The control logic 130 may be configured to control all operations of the memory device 100. The control logic 130 may operate in response to a command CMD transferred from an external device.

The control logic 130 may generate various signals in response to the command CMD and the address ADDR to control the peripheral circuit 120. For example, the control logic 130 may generate an operation signal OPSIG, the address ADDR, a read and write circuit control signal PBSIGNALS, and the allowable bit VRYBIT in response to the command CMD and the address ADDR. The control logic 130 may output the operation signal OPSIG to the voltage generator 122, output the address ADDR to the address decoder 121, output the read and write circuit control signal PBSIGNALS to the read and write circuit 123, and output the allowable bit VRYBIT to the sensing circuit 125. In addition, the control logic 130 may determine whether the verify operation is passed or failed in response to the pass or fail signal PASS/FAIL output by the sensing circuit 125.

Figure 3:
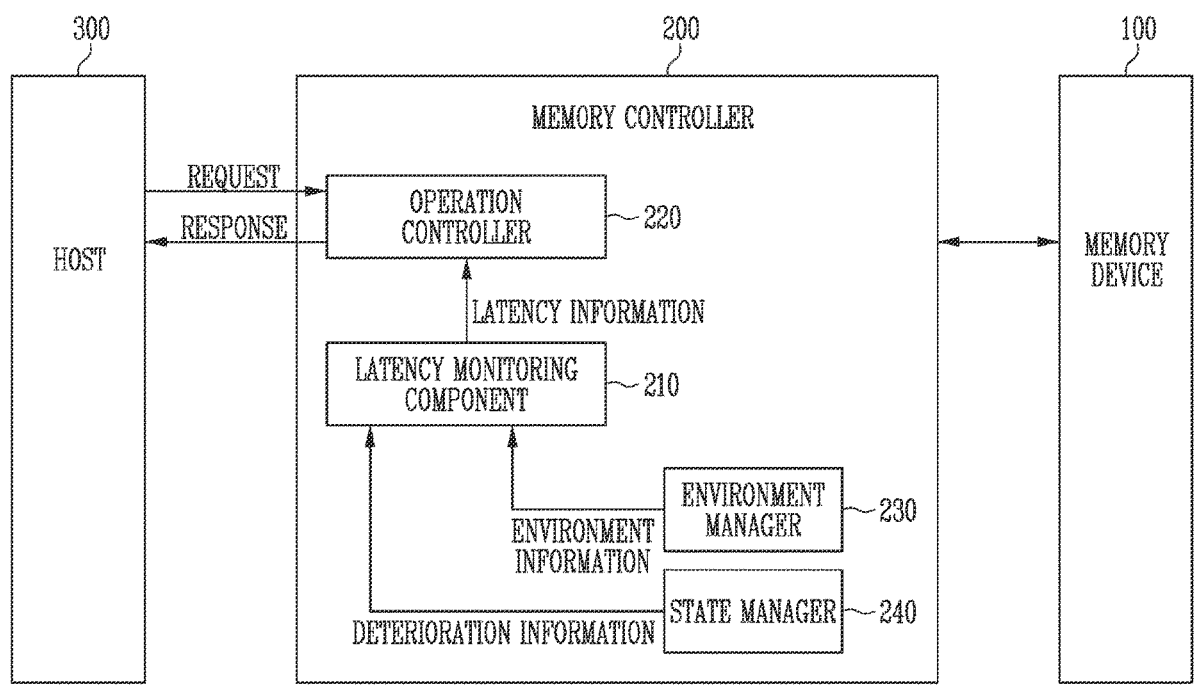
FIG. 3 is a diagram illustrating a configuration and an operation of a memory controller according to an embodiment of the present disclosure.

FIG. 3 is a diagram illustrating a configuration and an operation of a memory controller according to an embodiment of the present disclosure.

Referring to FIG. 3, the memory controller 200 may include a latency monitoring component 210 and an operation controller 220. The latency monitoring component 210 may be referred as the latency monitor 210. In an embodiment, the memory controller 200 may further include an environment manager 230. In an embodiment, the memory controller 200 may further include a state manager 240.

The latency monitor 210 may monitor latencies for requests received from the host 300. The latency monitor 210 may count, as over-latency count values, the number of over-latencies exceeding a reference value among the monitored latencies during a plurality of periods. An interval of each period may be the same. The latency monitor 210 may calculate gaps which are differences between the over-latency count values for the respective periods. The latency monitor 210 may generate latency information including the over-latency count values and the gaps.

When the memory controller 200 is turned on, the latency monitor 210 may monitor the latencies for the requests received from the host 300 and generate the latency information.

In an embodiment, the latency monitor 210 may be activated in response to an enable command received from the host 300, monitor the latencies, and generate the latency information. The enable command may include a set feature command. In an embodiment, the latency monitor 210 may determine whether an operation condition of the memory device 100 is out of a normal range based on environment information. The latency monitor 210 may be activated when the operation condition of the memory device 100 is out of the normal range. The latency monitor 210 may monitor the latencies, and generate the latency information. In an embodiment, the latency monitor 210 may determine whether the memory device 100 is in a deterioration state based on state information. The latency monitor 210 may be activated when the memory device 100 is in the deterioration state. The latency monitor 210 may monitor the latencies, and generate the latency information.

The operation controller 220 may determine whether each gap corresponding to at least two target periods among the plurality of periods exceeds a threshold value based on the latency information. The operation controller 220 may delay a response to the requests of the host 300 according to a determination result. The operation controller 220 may delay the response when each of the gaps corresponding to the at least two target periods exceeds the threshold value. The target periods may be successive periods. In another example, the target periods may not be successive each other.

When at least one of the gaps corresponding to the target periods is equal to or less than the threshold value, the operation controller 220 may set a response time to the request of the host 300 as a default value. When each of the gaps corresponding to the target periods exceeds the threshold value, the operation controller 220 may set the response time based on the default value and the over-latency count values of the target periods.

Specifically, the operation controller 220 may calculate a first value obtained by subtracting an allowable over-latency count value from an over-latency count value of a most recent period among the target periods. The operation controller 220 may set the response time as a value obtained by adding the default value and a second value obtained by multiplying the first value by a preset weighted value. In another embodiment, the first value may be a value obtained by subtracting the allowable over-latency count value from a minimum value, a maximum value, a median value, a representative value, or an average value among the over-latency count values of the target periods.

When garbage collection for the memory device 100 is being performed, the operation controller 220 may delay the response to the requests of the host 300 according to whether each of the gaps corresponding to the at least two target periods among the plurality of periods exceeds the threshold value.

The environment manager 230 may generate the environment information indicating whether the operation condition of the memory device 100 is out of the normal range. The operation condition may include at least one of a temperature, a humidity, a voltage, and a current of the memory device 100. The environment manager 230 may include a sensing circuit (not shown) for monitoring the operation condition.

The state manager 240 may store erase and write count values of each of the plurality of memory blocks included in the memory device 100. The state manager 240 may determine whether a difference between the erase and write count values between each memory block is equal to or greater than a set value. The state manager 240 may determine that the memory device 100 is in the deterioration state when the difference between the erase and write count values between the memory blocks is equal to or greater than the set value. The state manager 240 may generate deterioration information indicating whether the memory device 100 is in the deterioration state.

Figure 4:
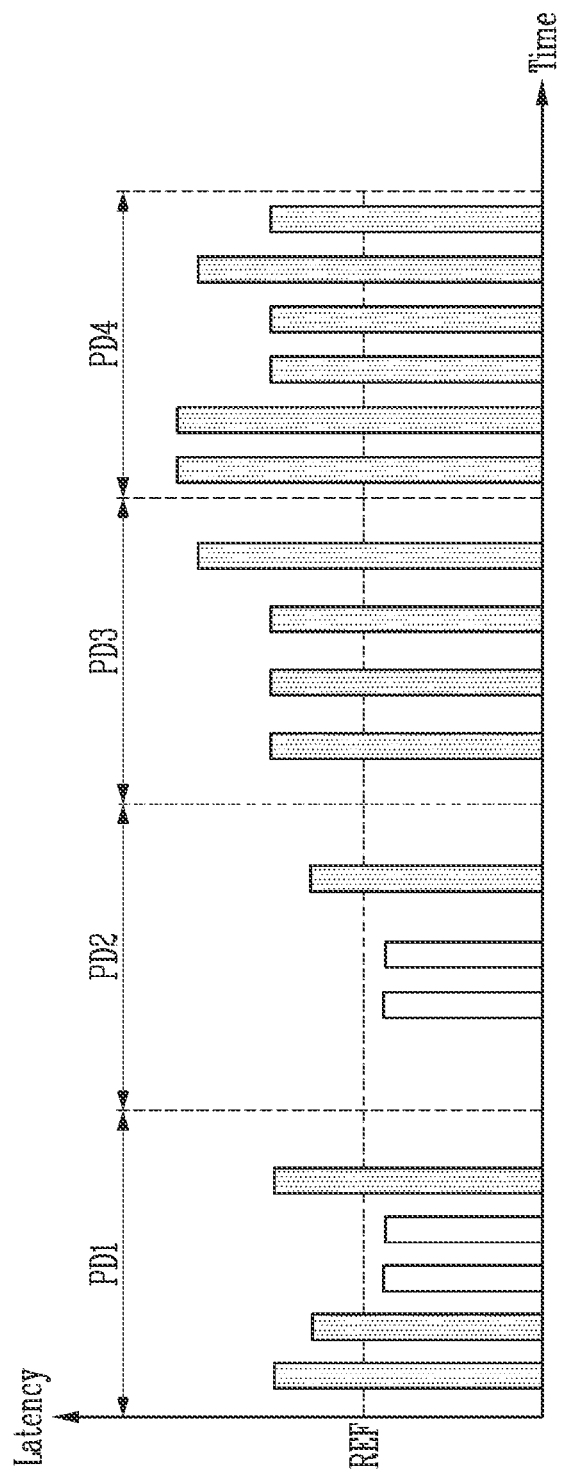
FIG. 4 is a diagram illustrating latencies of requests received from a host during a plurality of periods according to an embodiment of the present disclosure.

FIG. 4 is a diagram illustrating the latencies of the requests received from the host during the plurality of periods.

Referring to FIG. 4, the latencies of the response to the request received from the host may be monitored during the plurality of periods. The plurality of periods may include first to fourth periods PD1 to PD4. The number of periods and the number of latencies monitored in each period are not limited to the present embodiment. Among the latencies received in each period, a latency exceeding a reference value REF may be an over-latency. The over-latency count values and the gaps are described with reference to FIG. 5.

FIG. 5 is a diagram illustrating the over-latency count values and the gaps in FIG. 4 according to an embodiment of the present disclosure.

Referring to FIGS. 4 and 5, the number of latencies monitored during the first period PD1 may be five. The number of over-latencies exceeding the reference value may be three, which is the over-latency count value of the first period PD1. The number of latencies monitored during the second period PD2 may be three, and the number of over-latencies may be one, which is the over-latency count value of the second period PD2. The number of latencies monitored during the third period PD3 may be four, and the number of over-latencies may be four, which is the over-latency count value of the third period PD3. The number of latencies monitored during the fourth period PD4 may be six, and the number of over-latencies may be six, which is the over-latency count value of the fourth period PD4.

Since the first period PD1 is a start period, a gap may not be calculated. The gap between the over-latency count values respectively for the first and second periods PD1 and PD2 may be −2 obtained by subtracting 3 from 1. The gap may be a difference value between the over-latency count values respectively for previous and current periods. The gap between the over-latency count values respectively for the second and third periods PD2 and PD3 may be 3 obtained by subtracting 1 from 4. The gap between the over-latency count values respectively for the third and fourth periods PD3 and PD4 may be 2 obtained by subtracting 4 from 6.

Through the gap, it may be determined whether the number of over-latency increases or decreases in the current period compared to the previous period.

FIG. 6 is a diagram illustrating the latency information when the response to the host is not delayed according to an embodiment of the present disclosure.

Referring to FIG. 6, in the first period PD1, the number of monitored latencies may be 15, and the over-latency count value may be 10. In the second period PD2, the number of monitored latencies may be 15, the over-latency count value may be 14, and the gap between the over-latency count values respectively for the first and second periods PD1 and PD2 may be 4. In the third period PD3, the number of monitored latencies may be 15, the over-latency count value may be 14, and the gap between the over-latency count values respectively for the second and third periods PD2 and PD3 may be 0. In the fourth period PD4, the number of monitored latencies may be 20, the over-latency count value may be 16, and the gap between the over-latency count values respectively for the third and fourth periods PD3 and PD4 may be 2.

In FIG. 6, a threshold value TH_G of the gap may be 3. The threshold value TH_G of the gap is not limited to the present embodiment. A period in which the gap exceeds the threshold value among the first to fourth periods PD1 to PD4 may be the second period PD2.

However, since the number of periods in which the gap exceeds the threshold value is one, at least two successive periods in which the gap exceeds the threshold value do not exist, and thus the memory controller may not delay the response to the host in FIG. 6.

FIG. 7 is a diagram illustrating the latency information when the response to the host is delayed according to an embodiment of the present disclosure.

Referring to FIG. 7, in the first period PD1, the number of monitored latencies may be 15 and the over-latency count value may be 10. In the second period PD2, the number of monitored latencies may be 10, the over-latency count value may be 10, and the gap between the over-latency count values respectively for the first and second periods PD1 and PD2 may be 0. In the third period PD3, the number of monitored latencies may be 15, the over-latency count value may be 14, and the gap between the over-latency count values respectively for the second and third periods PD2 and PD3 may be 4. In the fourth period PD4, the number of monitored latencies may be 20, the over-latency count value may be 19, and the gap between the over-latency count values respectively for the third and fourth periods PD3 and PD4 may be 5.

In FIG. 7, the periods in which each gap exceeds the threshold value among the first to fourth periods PD1 to PD4 may be the third and fourth periods PD3 and PD4. Since at least two successive target periods of which each gaps exceeds the threshold exist, the memory controller may delay the response to the host in FIG. 7.

FIG. 8 is a diagram illustrating a response time according to an embodiment of the present disclosure.

Referring to FIG. 8, the response time to the request of the host may be basically set to the default value.

As described with reference to FIG. 7, when the response to the host is delayed, the response time Response Time* may be set based on the default value and the over-latency count values of the target periods.

For example, when the response is delayed, the response time may be set to a value obtained by adding the default value to the second value obtained by multiplying the first value by the preset weighted value. At this time, the first value may be the value obtained by subtracting the allowable over-latency count value from the over-latency count value of the most recent period among the target periods. In another embodiment, the first value may be the value obtained by subtracting the allowable over-latency count value from the minimum value, the maximum value, the median value, the representative value, or the average value among the over-latency count values of the target periods.

In FIG. 8, the default value may be 10, the weighted value may be 0.5, and the allowable over-latency count value may be set to 15. The weighted value and the allowable over-latency count value are not limited to the present embodiment. Referring to the latency information shown in FIG. 7, the over-latency count value of the fourth period PD4 that is the most recent period may be 19.

Therefore, when the memory controller does not delay the response to the host, the response time may be 10, but when the memory controller delays the response to the host, the response time may be set to 15.

FIG. 9 is a flowchart illustrating an operation of a memory controller according to an embodiment of the present disclosure.

Referring to FIG. 9, in operation 5901, the memory controller may count the number of over-latencies among the latencies of the requests received from the host during the plurality of periods.

In operation 5903, the memory controller may calculate the gaps which are the difference values of the over-latency count values of the plurality of periods.

In operation 5905, the memory controller may delay the response to the request to the host according to whether each of the gaps corresponding to the at least two target periods among the plurality of periods exceeds the threshold value.

FIG. 10 is a flowchart illustrating an operation of a memory controller according to an embodiment of the present disclosure.

Referring to FIG. 10, in operation S1001, the memory controller may receive the enable command from the host. The enable command may be the command for activating the latency monitor. The enable command may include the set feature command.

In operation S1003, when the enable command is received, the memory controller may generate the latency information including the over-latency count values and the gaps, FIG. 11 is a flowchart illustrating an operation of a memory controller according to an embodiment of the present disclosure.

Referring to FIG. 11, in operation S1101, the memory controller may sense whether the operation condition of the memory device is out of the normal range and is abnormal. The operation condition may include at least one of the temperature, the humidity, the voltage, and the current.

In operation S1103, when abnormality of the operation condition is sensed, the memory controller may generate the latency information including the over-latency count values and the gaps.

Figure 12:
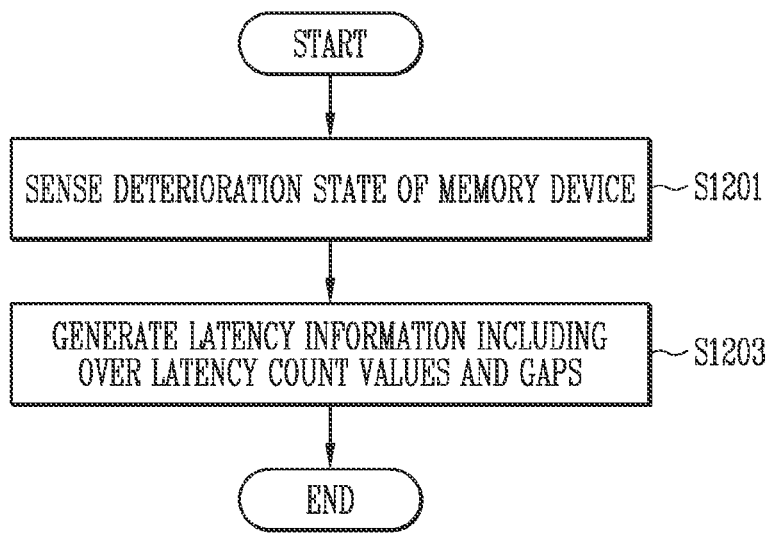
FIG. 12 is a flowchart illustrating an operation of a memory controller according to an embodiment of the present disclosure.

FIG. 12 is a flowchart illustrating an operation of a memory controller according to an embodiment of the present disclosure.

Referring to FIG. 12, in operation S1201, the memory controller may sense the deterioration state of the memory device. For example, when the difference between the erase and write count values of each of the plurality of memory blocks included in the memory device is equal to or greater than the set value, the memory controller may determine that the memory device is in the deterioration state.

In operation S1203, when the deterioration state of the memory device is sensed, the memory controller may generate the latency information including the over-latency count values and the gaps.

Figure 13:
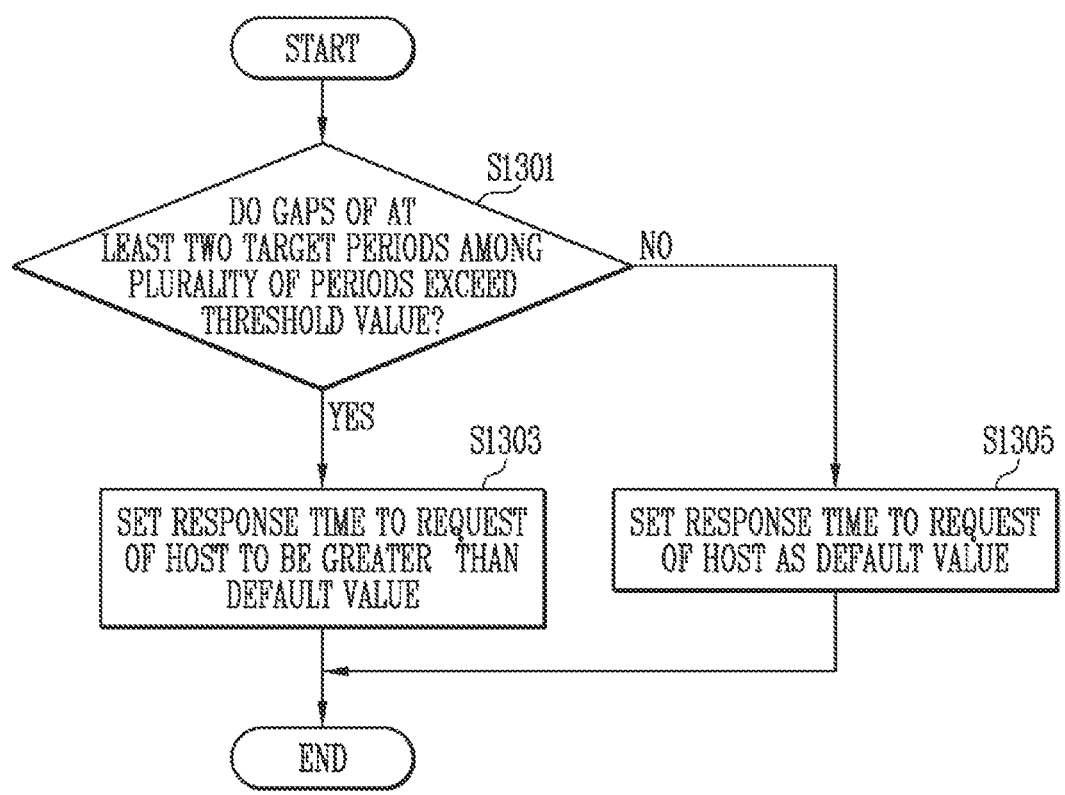
FIG. 13 is a flowchart illustrating an operation of a memory controller according to an embodiment of the present disclosure.

FIG. 13 is a flowchart illustrating an operation of a memory controller according to an embodiment of the present disclosure.

Referring to FIG. 13, in operation S1301, the memory controller may determine whether each gap corresponding to the at least two target periods among the plurality of periods exceeds the threshold value. As a result of the determination, when each gap corresponding to the at least two target periods exceeds the threshold value, the operation proceeds to operation S1303. When any of the gaps corresponding to the at least two target periods is equal to or less than the threshold value, the operation proceeds to operation S1305. The target periods may be successive periods. In another embodiment, some of the target periods may be discontinuous.

In operation S1303, the memory controller may set the response time to the request of the host to be greater than the default value.

Figure 14:
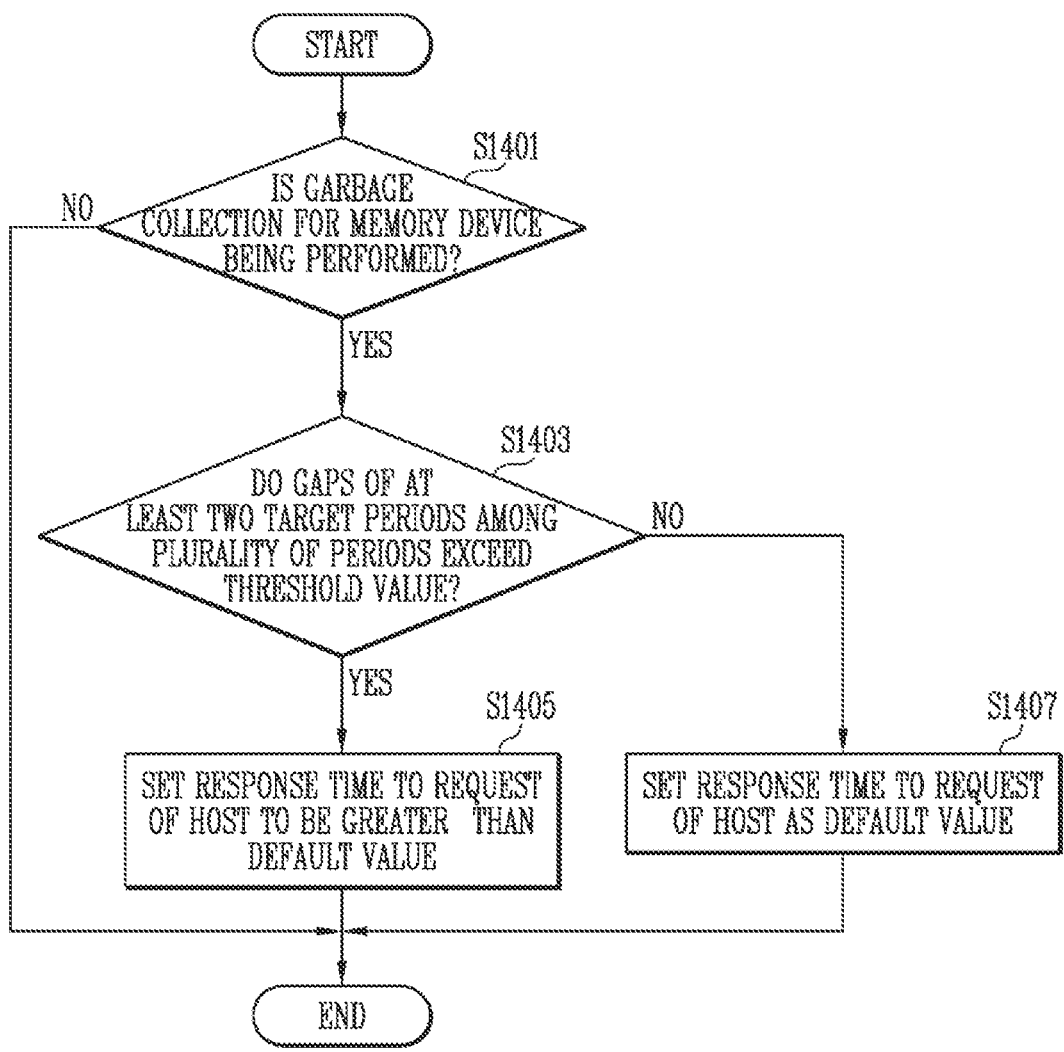
FIG. 14 is a flowchart illustrating an operation of a memory controller according to an embodiment of the present disclosure.

In operation S1305, the memory controller may set the response time to the request of the host as the default value, FIG. 14 is a flowchart illustrating an operation of a memory controller according to an embodiment of the present disclosure.

Referring to FIG. 14, in operation 51401, the memory controller may determine whether the garbage collection for the memory device is being performed. As a result of the determination, when the garbage collection is being performed, the operation proceeds to operation S1403. When the garbage collection is not being performed, the operation is ended.

Operations S1403 to S1407 may be described similarly to operations S1301 to S1305 of FIG. 13.

Figure 15:
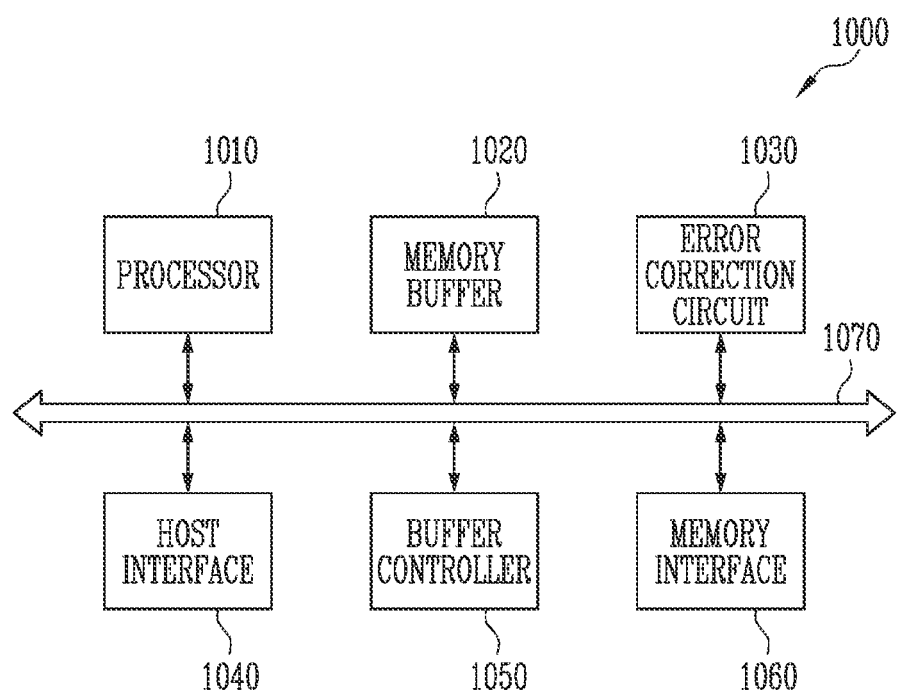
FIG. 15 is a diagram illustrating a memory controller of FIG. 1 according to an embodiment of the present disclosure.

FIG. 15 is a diagram illustrating the memory controller of FIG. 1 according to an embodiment of the present disclosure.

Referring to FIG. 15, the memory controller 1000 is connected to a host and the memory device. The memory controller 1000 may access the memory device in response to a request from the host. For example, the memory controller 1000 may control the write, read, erase, and background operations of the memory device. The memory controller 1000 may provide an interface between the memory device and the host. The memory controller 1000 may drive firmware for controlling the memory device.

The memory controller 1000 may include a processor 1010, a memory buffer 1020, an error correction circuit (ECC) 1030, a host interface 1040, a buffer controller 1050, a memory interface 1060, and a bus 1070.

The bus 1070 may be configured to provide a channel between components of the memory controller 1000.

The processor 1010 may control an overall operation of the memory controller 1000 and may perform a logical operation. The processor 1010 may communicate with an external host through the host interface 1040 and communicate with the memory device through the memory interface 1060. In addition, the processor 1010 may communicate with the memory buffer 1020 through the buffer controller 1050. The processor 1010 may control an operation of the storage device using the memory buffer 1020 as an operation memory, a cache memory, or a buffer memory.

The processor 1010 may perform a function of an FTL. The processor 1010 may convert an LBA provided by the host into a PBA through the FTL. The FTL may receive the LBA and convert the LBA into the PBA using a mapping table. An address mapping method of the flash translation layer may include various methods according to a mapping unit. A representative address mapping method includes a page mapping method, a block mapping method, and a hybrid mapping method.

The processor 1010 may randomize data received from the host. For example, the processor 1010 may randomize the data received from the host using a randomizing seed. The randomized data is provided to the memory device as data to be stored and is programmed to the memory cell array.

The processor 1010 may de-randomize data received from the memory device during the read operation. For example, the processor 1010 may de-randomize the data received from the memory device using a de-randomizing seed. The de-randomized data may be output to the host.

In an embodiment, the processor 1010 may perform the randomization and the de-randomization by driving software or firmware.

The memory buffer 1020 may be used as an operation memory, a cache memory, or a buffer memory of the processor 1010. The memory buffer 1020 may store codes and commands executed by the processor 1010. The memory buffer 1020 may store data processed by the processor 1010. The memory buffer 1020 may include a static RAM (SRAM) or a dynamic RAM (DRAM).

The ECC 1030 may perform error correction. The ECC 1030 may perform error correction encoding (ECC encoding) based on data to be written to the memory device through memory interface 1060. The error correction encoded data may be transferred to the memory device through the memory interface 1060. The ECC 1030 may perform error correction decoding (ECC decoding) on the data received from the memory device through the memory interface 1060. For example, the ECC 1030 may be included in the memory interface 1060 as a component of the memory interface 1060.

The host interface 1040 may communicate with an external host under control of the processor 1010. The host interface 1040 may be configured to perform communication using at least one of varies communication standards or interfaces such as a universal serial bus (USB), a serial AT attachment (SATA), a serial attached SCSI (SAS), a high speed interchip (HSIC), a small computer system interface (SCSI), a peripheral component interconnection (PCI express), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The buffer controller 1050 may control the memory buffer 1020 under the control of the processor 1010.

The memory interface 1060 may communicate with the memory device under the control of the processor 1010. The memory interface 1060 may communicate a command, an address, and data with the memory device through a channel.

For example, the memory controller 1000 may not include the memory buffer 1020 and the buffer controller 1050.

For example, the processor 1010 may control the operation of the memory controller 1000 using codes. The processor 1010 may load the codes from a nonvolatile memory device (for example, a read only memory) provided inside the memory controller 1000. As another example, the processor 1010 may load the codes from the memory device through the memory interface 1060.

For example, the bus 1070 of the memory controller 1000 may be divided into a control bus and a data bus. The data bus may be configured to transmit data within the memory controller 1000 and the control bus may be configured to transmit control information such as a command and an address within the memory controller 1000. The data bus and the control bus may be separated from each other and may not interfere with each other or affect each other. The data bus may be connected to the host interface 1040, the buffer controller 1050, the ECC 1030, and the memory interface 1060. The control bus may be connected to the host interface 1040, the processor 1010, the buffer controller 1050, the memory buffer 1020, and the memory interface 1060.

Figure 16:
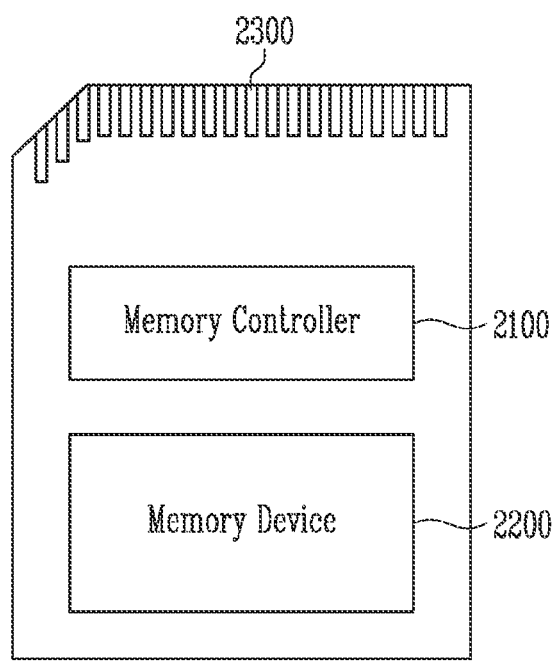
FIG. 16 is a block diagram illustrating a memory card system to which a storage device according to an embodiment of the present disclosure is applied.

FIG. 16 is a block diagram illustrating a memory card system to which a storage device according to an embodiment of the present disclosure is applied.

Referring to FIG. 16, the memory card system 2000 includes a memory controller 2100, a memory device 2200, and a connector 2300.

The memory controller 2100 is connected to the memory device 2200. The memory controller 2100 may access the memory device 2200. For example, the memory controller 2100 may be configured to control read, write, erase, and background operations of the memory device 2200. The memory controller 2100 may provide an interface between the memory device 2200 and a host. The memory controller 2100 may drive firmware for controlling the memory device 2200. The memory controller 2100 may be implemented identically to the memory controller 200 described with reference to FIG. 1.

For example, the memory controller 2100 may include components such as a random access memory (RAM), a processor, a host interface, a memory interface, and an ECC.

The memory controller 2100 may communicate with an external device through the connector 2300. The memory controller 2100 may communicate with an external device (for example, the host) according to a specific communication standard. For example, the memory controller 2100 may communicate with an external device through at least one of various communication standards or interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards or interfaces described above.

For example, the memory device 2200 may be configured of various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque-magnetic RAM (STT-MRAM).

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash (CF) card, a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 17:
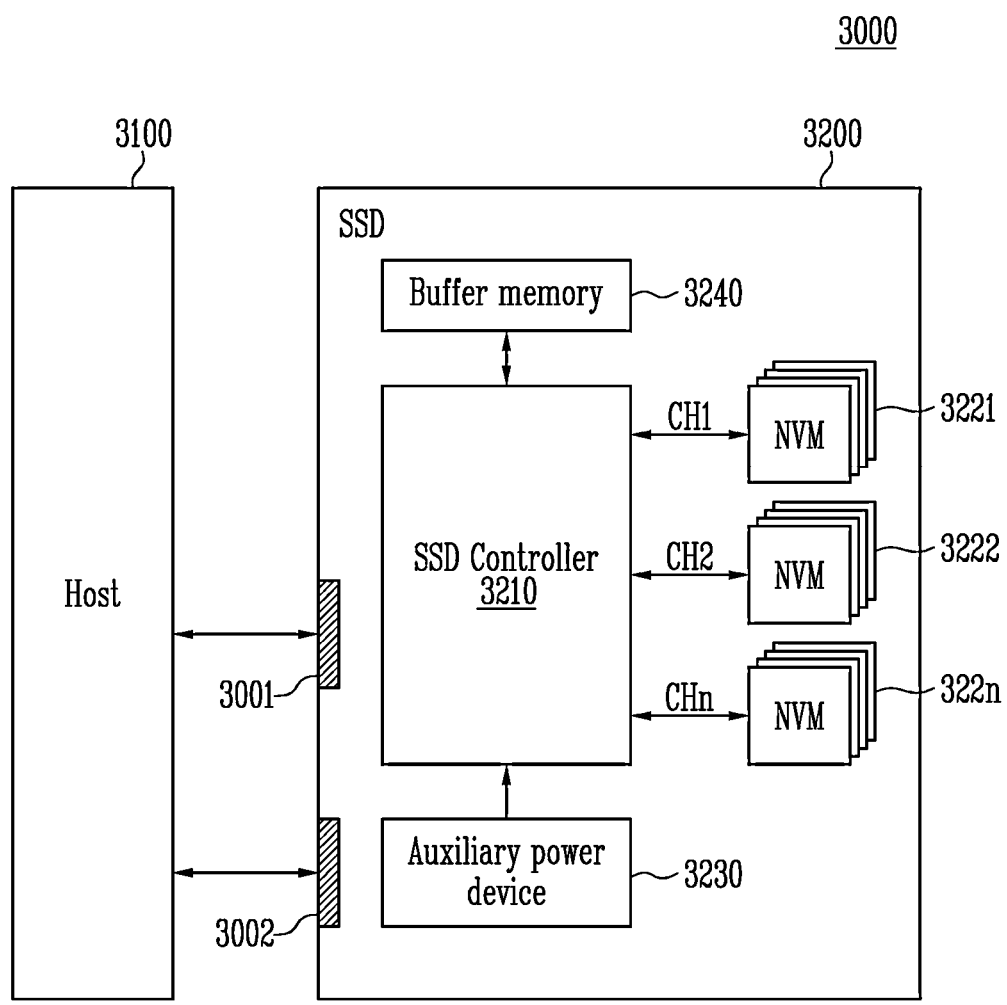
FIG. 17 is a block diagram illustrating a solid state drive (SSD) system to which a storage device according to an embodiment of the present disclosure is applied.

FIG. 17 is a block diagram illustrating a solid state drive (SSD) system to which a storage device according to an embodiment of the present disclosure is applied.

Referring to FIG. 17, the SSD system 3000 includes a host 3100 and an SSD 3200. The SSD 3200 exchanges a signal with the host 3100 through a signal connector 3001 and receives power through a power connector 3002. The SSD 3200 includes an SSD controller 3210, a plurality of flash memories 3221 to 322n, an auxiliary power device 3230, and a buffer memory 3240.

According to an embodiment of the present disclosure, the SSD controller 3210 may perform the function of the memory controller 200 described with reference to FIG. 1.

The SSD controller 3210 may control the plurality of flash memories 3221 to 322n in response to the signal received from the host 3100. For example, the signal may be signals based on an interface between the host 3100 and the SSD 3200. For example, the signal may be a signal defined by at least one of communication standards or interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power device 3230 is connected to the host 3100 through the power connector 3002. The auxiliary power device 3230 may receive the power from the host 3100 and may charge the power. The auxiliary power device 3230 may provide power to the SSD 3200 when power supply from the host 3100 is not smooth. For example, the auxiliary power device 3230 may be positioned in the SSD 3200 or may be positioned outside the SSD 3200. For example, the auxiliary power device 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store meta data (for example, a mapping table) of the flash memories 3221 to 322n. The buffer memory 3240 may include a volatile memory such as a DRAM, an SDRAM, a DDR SDRAM, an LPDDR SDRAM, and a GRAM, or a nonvolatile memory such as an FRAM, a ReRAM, an STT-MRAM, and a PRAM.

Figure 18:
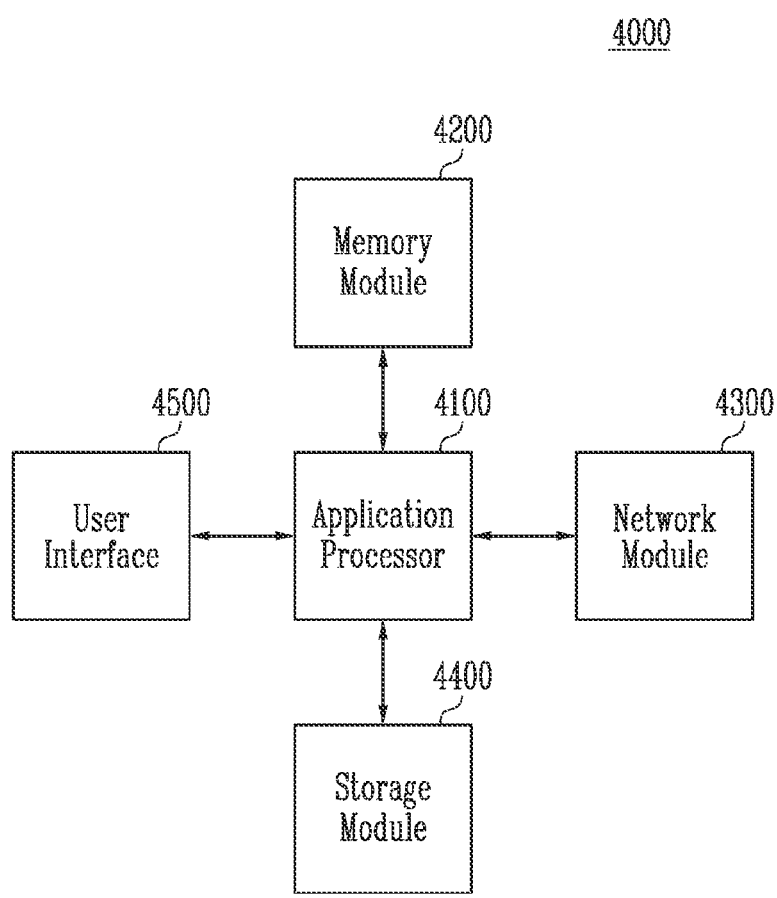
FIG. 18 is a block diagram illustrating a user system to which a storage device according to an embodiment of the present disclosure is applied.

FIG. 18 is a block diagram illustrating a user system to which a storage device according to an embodiment of the present disclosure is applied.

Referring to FIG. 18, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000.

The network module 4300 may communicate with external devices. For example, the network module 4300 may support wireless communication such as code division multiple access (CDMA), global system for mobile communications (GSM), wideband CDMA ('CDMA), CDMA-2000, time division multiple access (TDMA), long term evolution, Wimax, WLAN, UVEB, Bluetooth, and Wi-Fi. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented as a nonvolatile semiconductor memory element such as a phase-change RAM (PRAM), a magnetic RAM (MRAM), a resistive RAM (DRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of nonvolatile memory devices, and the plurality of nonvolatile memory devices may operate identically to the memory device 100 described with reference to FIG. 1. The storage module 4400 may operate identically to the storage device described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

It should be noted that the scope of the present disclosure is defined by the accompanying claims, rather than by the foregoing detailed descriptions, and all changes or modifications derived from the meaning and scope of the claims and equivalents thereof are included in the scope of the present disclosure. Furthermore, the embodiments may be combined to form additional embodiments.

What is claimed is:

1. A memory controller comprising:
   a latency monitor configured to count an over-latency count value representing a number of over-latencies exceeding a reference value among latencies for requests from a host during each of a plurality of periods, calculate gaps which are difference values between the over-latency count values of the plurality of periods, and generate latency information including the over-latency count values and the gaps; and
   an operation controller configured to determine, based on the latency information, whether each gap corresponding to at least two target periods among the plurality of periods exceeds a threshold value, and delay a response to the requests according to a determination result.

2. The memory controller of claim 1, wherein the target periods are successive periods.

3. The memory controller of claim 1, wherein the latency monitor is configured to generate the latency information ire response to an enable command received from the host.

4. The memory controller of claim 3, wherein the enable command includes a set feature command.

5. The memory controller of claim 1, wherein the latency monitor is configured to generate the latency information when an operation condition of a memory device is out of a normal range.

6. The memory controller of claim 5,
   further comprising an environment manager configured to generate environmental information indicating whether the operation condition is out of the normal range,
   wherein the operation condition includes at least one of a temperature, a humidity, a voltage, and a current of the memory device.

7. The memory controller of claim 1, wherein the latency monitor is configured to generates the latency information when it is deter mined that a memory device is in a deterioration state.

8. The memory controller of claim 7, further comprising a state manager configured to:
   store erase and write count values of each of a plurality of memory blocks included in the memory device, and
   generate deterioration information indicating whether the memory device is in the deterioration state based on whether a difference between erase and write count values of the respective memory blocks is equal to or greater than a set value.

9. The memory controller of claim 1, wherein the operation controller is further configured to set a response time of the response to a default value when at least one of the gaps corresponding to the target periods is equal to or less than the threshold value.

10. The memory controller of claim 1, wherein the operation controller is further configured to delay the response by setting a response time of the response based on a default value and the over-latency count values of the target periods when each gap corresponding to the target periods exceeds the threshold value.

11. The memory controller of claim 10, wherein the operation controller is configured to set the response time by:
    calculating a first value by subtracting an allowable over-latency count value from the over-latency count value of a most recent period among the target periods, and
    setting the response time to a value obtained by adding the default value to a second value obtained by multiplying the first value by a preset weighted value.

12. The memory controller of claim 1, wherein the operation controller is configured to delay the response when garbage collection for a memory device is being performed.

13. A method of operating a memory controller, the method comprising:
    counting an over-latency count value representing a number of over-latencies exceeding a reference value among latencies for requests of a host during each of a plurality of periods;
    calculating gaps which are difference values between the over-latency count values of the plurality of periods;
    generating latency information including the over-latency count values and the gaps;
    determining, based on the latency information, whether each gap corresponding to at least two target periods among the plurality of periods exceeds a threshold value; and
    delaying a response to the requests according to a result of the determining.

14. The method of claim 13, wherein the target periods are successive periods.

15. The method of claim 13, wherein the latency information is generated in response to an enable command received from the host.

16. The method of claim 13,
    further comprising generating environmental information indicating whether an operation condition of a memory device including at least one of a temperature, a humidity, a voltage, and a current of the memory device is out of a normal range,
    wherein the latency information is generated when the operation condition is out of the normal range according to the environment information.

17. The method of claim 13,
    further comprising generating deterioration information indicating whether a memory device is in a deterioration state according to whether a difference between erase and write count values of respective memory blocks included in the memory device is equal to or greater than a set value,
    wherein the latency information is generated when it is determined that the memory device is in the deterioration state according to the deterioration information.

18. The method of claim 13, further comprising setting a response time of the response to a default value when at least one of the gaps corresponding to the target periods is equal to or less than the threshold value.

19. The method of claim 13, wherein the delaying the response comprises setting a response time of the response based on a default value and the over-latency count values of the target periods when each gap corresponding to the target periods exceeds the threshold value.

20. The method of claim 19,
    wherein the response time is set to a value obtained by adding the default value to a second value obtained by multiplying a first value by a preset weighted value, and
    wherein the first value is a value obtained by subtracting an allowable over-latency count value from the over-latency count value of a most recent period among the target periods.

* * * * *